United States Patent
Kim

[11] 3,818,064
[45] June 18, 1974

[54] LOW TEMPERATURE FLUOROSILICONE COMPOSITIONS

[75] Inventor: Yung K. Kim, Midland, Mich.

[73] Assignee: Dow Corning Corporation, Midland, Mich.

[22] Filed: Aug. 31, 1973

[21] Appl. No.: 393,381

[52] U.S. Cl...... 260/448.2 D, 252/49.6, 260/37 SB, 260/46.5 P, 260/448.2 E
[51] Int. Cl. ............................................. C07f 7/08
[58] Field of Search.................. 260/448.2 D, 46.5 R

[56] References Cited
UNITED STATES PATENTS
3,627,801   12/1971   Pierce et al.................. 260/448.2 D
3,647,740   3/1972    Loree et al. ............. 260/448.2 D X
3,666,718   5/1972    Patterson et al. .............. 260/46.5 P Primary Examiner—Daniel E. Wyman
Assistant Examiner—Paul F. Shaver
Attorney, Agent, or Firm—Robert F. Fleming, Jr.

[57] ABSTRACT

Organosilicon compounds of the formula

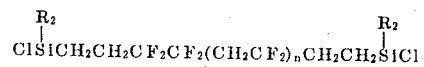

are prepared by reacting 1,2-dibromotetrafluoroethylene with vinylidene fluoride followed by addition to two moles of ethylene and then dehydrobromination to give the diene $CH_2=CHCF_2CF_2(CH_2CF_2)_nCH=CH_2$. To the latter is added two moles of $R_2HSiCl$. The chlorosilane is hydrolyzed to the corresponding siloxane which can be converted to rubbery polymers combining excellent thermal stability at elevated temperatures and a lower glass transition temperature than polymers of the formula

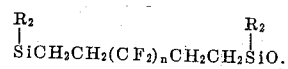

A typical example of the new compounds is

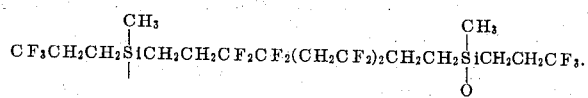

5 Claims, No Drawings

LOW TEMPERATURE FLUOROSILICONE COMPOSITIONS

The usefulness of organopolysiloxanes as sealants, electrical insulation and for other applications involving the use of rubber, fluids or resins is well known. These materials have excellent high temperature stability in air, good electrical properties and excellent flexibility at low temperatures. However, the organopolysiloxanes suffer from one serious disadvantage which limits their use in those applications requiring high temperatures under confined conditions. Under these conditions, any ROH compound, such as water, carboxylic acid, or alcohols ruptures the siloxane chain causing degradation of the siloxane polymer. This converts silicone rubbers, for example, into soft fluids.

One great advance in solving this problem is made by those materials shown in U.S. Pat. No. 3,647,740 which have the structure

in which $R_f$ is a perfluoroalkylene radical. These materials have greatly improved reversion resistance as compared with previously known organopolysiloxanes. However, those materials containing the $R_f$ group have relatively high glass transition temperatures. As shown in the publication "Fluorosilicones as High Temperature Elastomers," by Ogden R. Pierce and Yung K. Kim, J. Elastoplastics, Vol. III, April, 1971, those compounds in which $R_f$ is $-CF_2CF_2-$ or higher have glass transition temperatures in the range of $-27°C.$ or higher. The compound in which $R_f$ is $-CF_2-$ has a glass transition temperature of about $-38°C$. However, this compound lacks the thermal stability of the other compounds in the publication and also lacks the thermal stability of the compositions of this invention as will be shown hereinafter. It would be greatly desirable, therefore, to have organosilicon materials having the thermal stability of most of the compounds of the aforesaid patent and at the same time possessing lower glass transition temperatures. This would increase the usable range of reversion resistant organopolysiloxane rubbers, fluids and resins.

These objectives are obtained by employing the compositions of this invention.

This invention relates to silanes of the formula

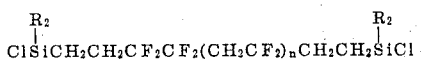

in which
$R$ is a phenyl, methyl, or $R_fCH_2CH_2-$ radical in which $R_f$ is a perfluoroalkyl radical of one to four carbon atoms, and
$n$ is an integer from one to six inclusive.

The silanes of this invention are prepared according to the following synthetic scheme:

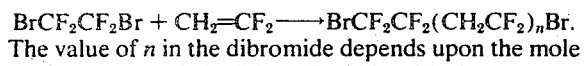

The value of $n$ in the dibromide depends upon the mole ratio of vinylidene fluoride with the dibromotetrafluoroethylene. By varying this mole ratio; that is, by varying the pressure of the vinylidene fluoride in the reaction vessel one can obtain values of $n$ from 1 to 6.

The dibromide thus obtained is reacted with ethylene to give compounds of the formula $BrCH_2CH_2CF_2CF_2(CH_2CF_2)_nCH_2CH_2Br$. The latter are then dehydrobrominated by reacting with alcoholic KOH to give dienes of the formula $CH_2=CHCF_2CF_2(CH_2CF_2)_nCH=CH_2$ The dienes are reacted with $HR_2SiCl$ to give the claimed silanes.

The silanes per se can be used to render surfaces water or oil repellent and they can be used to prepare siloxanes.

This invention also relates to siloxanes having at least one unit of the formula (1)

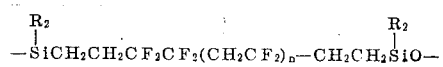

any remaining siloxane units being essentially all of the formula (2) $R'_mSiO_{4-m/2}$ in which
$R$ is a phenyl, methyl, or $R_fCH_2CH_2-$ radical,
$R'$ is H, phenyl, methyl, vinyl or a $R_fCH_2CH_2$ radical,
$R_f$ is a perfluoroalkyl radical of one to four carbon atoms,
$n$ is an integer from 1 to 6 and
$m$ is an integer from 0 to 3.
Where A represents the unit

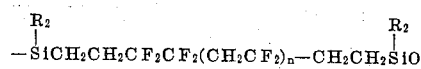

it can be seen that the siloxanes of this invention can be homopolymers or copolymers, the latter containing two or more different types of A units. The siloxanes of this invention can also be copolymers containing A units and units of formula $R'_mSiO_{4-m/2}$ such as, for example, $R_3SiOASiR_3$, $R_2SiOA$, $RSiO_{3/2}A$ or $SiO_2A$ or any combinations thereof.

These copolymers can be prepared by cohydrolyzing the corresponding silanes and cocondensing in accordance with standard procedures well known in the organosilicon art.

Specific examples of $R'_mSiO_{4-m/2}$ units employed herein are $(CH_3)_2SiO$, $(CH_3)_3SiO_{.5}$, $CH_3SiO_{3/2}$, $(CH_3)HSiO$, $(CH_3)_2HSiO_{.5}$, $C_6H_5SiO_{3/2}$, $(C_6H_5)_2SiO$, $C_6H_5(CH_3)_2SiO_{.5}$, $(C_6H_5)_2CH_3SiO_{.5}$, $CF_3CH_2CH_2SiO_{3/2}$, $(CF_3CH_2CH_2)_2SiO$, $CF_3CH_2CH_2(CH_3)SiO$, $CF_3CH_2CH_2(CH_3)_2SiO_{.5}$, $C_2H_3SiO_{3/2}$, $C_2H_3(CH_3)SiO$, $C_2H_3(CH_3)_2SiO_{.5}$, $C_6H_5(CH_3)(C_2H_3)SiO_{.5}$, $(C_6H_5)HSiO$, $C_2F_5CH_2CH_2SiO_{3/2}$, $C_3F_7CH_2CH_2(CH_3)SiO$ and $SiO_2$.

The siloxane homopolymers or copolymers of this invention can be in the form of or converted to fluids, rubbers, or resins. The rubbers can be made by any of the conventional means for preparing organosilicon rubbers.

For example, they can be heat cured by heating the organopolysiloxanes with organic peroxides. This vulcanization is facilitated when the siloxanes contain vinyl groups. Alternatively, the rubbers can be prepared by heating a mixture of the organosilicon compounds containing vinyl radicals with SiH containing siloxanes in the presence of platinum catalyst.

Rubbers can be prepared at room temperature by mixing the siloxanes which contain silicon-bonded hydroxyl groups with crosslinking agents such as alkyl triacetoxysilanes such as methyltriacetoxysilane or trifluoropropyltriacetoxysilane; silicates such as ethyl silicate, ethypolysilicate, or N-propylsilicate; alkoxysilanes such as methyltrimethoxysilane or vinyltrimethoxysilane; ketoximesilanes such as those of the formula $CH_3Si\{ON=C(CH_3)_2\}_3$ and any other of the well known silane crosslinking agents.

The fluids can be prepared by cohydrolyzing the silanes of this invention with $R'_3SiCl$, by cocondensing the instant siloxane A with $R_3SiOSiR_3$ and by other conventional means for preparing siloxane fluids.

The resinous siloxanes of this invention can be prepared by cohydrolyzing and cocondensing siloxanes of the formula $RSiO_{3/2}$ and $SiO_2$ with the silanes of this invention. This can be carried out in a conventional manner and the copolymers so prepared can be cured using conventional siloxane resin catalysts such as metal acylates, such as lead or tin octoates. Alternatively, resins can be prepared by using the combination of vinyl containing siloxanes and SiH containing siloxanes and catalyzing the mixture with Pt. To make a resin rather than a rubber, one uses a higher crosslink density.

The resins and rubbers of this invention can contain conventional fillers, such as asbestos, fume silica, carbon black, mica, glass fibers, diatomaceous earth, and also other additives such as plasticizers, oxidation inhibitors, compression set additives, etc., which are normally used with organopolysiloxane rubbers and resins.

The siloxanes of this invention can be used as lubricants, dielectric fluids, sealants for fuel tanks and other devices and electrical insulation.

The following examples are illustrative only and should not be construed as limiting the invention which is properly delineated in the appended claims. In the examples, Z is the group $-CH_2CH_2CF_2CF_2(CH_2CF_2)_2\text{-}CH_2CH_2-$.

Example 1

PREPARATION OF DIBROMIDE

A two liter reaction vessel was charged with 1950 g. of dibromotetrafluoroethylene and 40 g. of ditertiary butyl peroxide. The reactor was heated to 130°C. and pressurized to 200 p.s.i. with vinylidene fluoride. An exotherm occurred so the heating was stopped and the pressure adjusted to 125 p.s.i. Heating was continued at 130° to 135°C. for 8 hours. At the end of this time 15 g. of ditertiary butyl peroxide was added and heating was continued at 130° to 135°C. at 80 p.s.i. for 7 hours.

The above reaction was repeated using 1,700 g. of debromotetrafluoroethylene and 38 g. of t-butyl peroxide in which the vinylidene fluoride was added at a pressure of 40 p.s.i. and a temperature of 130° to 135°C. for 2 hours and then the reaction was continued at a vinylidene fluoride pressure of 140 p.s.i. at 135°C. for 7 hours. The crude reaction products were combined and were distilled to give the following products having the following properties:

| No. | Amount | Compound | Boiling Point | Refractive Index at 25°C. |
|-----|--------|----------|---------------|---------------------------|
| 1 | 640 g. | $BrCF_2CF_2CH_2CF_2Br$ | 44–45°C. at 46 mm. | 1.3775 |
| 2 | 635 g. | $BrCF_2CF_2(CH_2CF_2)_2Br$ | 72–73°C. at 20 mm. | 1.3820 |
| 3 | 479 g. | $BrCF_2CF_2(CH_2CF_2)_3Br$ | 87–89°C. at 5 mm. | 1.3840 |
| 4 | 132 g. | $BrCF_2CF_2(CH_2CF_2)_4Br$ | 75°C. at less than 1 mm. | 1.3863 |

Example 2

PREPARATION OF DIENE 630 g. of $BrCF_2CF_2(CH_2CF_2)_2Br$ and 12 g. of di-t-butyl peroxide were placed in a vessel and the vessel was flushed free of air with ethylene. The reaction vessel was closed and heated at 130° to 140°C. under total ethylene pressure of 50 to 60 p.s.i. for 5 hours. From the crude reaction mixture unreacted starting material and the 1:1 adduct were distilled. The 1:1 adduct was further reacted with ethylene in the same manner described above to yield the desired product $BrCH_2CH_2CF_2CF_2(CH_2CF_2)_2CH_2CH_2Br$, melting point 75°–76°C. when recrystallized from ethanol.

240 g. of the purified dibromide above was slurried in 700 ml. of ethanol and there was added thereto at room temperature a solution of 70 g. of potassium hydroxide in 400 ml. of ethanol. After the addition, the reaction mixture was stirred at room temperature overnight then about 600 ml. of water was added to the mixture and the organic layer was separated. After washing with water and drying, the distillation of the crude product gave the diene $CH_2=CHCF_2CF_2(CH_2CF_2)_2CH=CH_2$, boiling point 73°C. at 10 mm. and having a refractive index of 1.3630 at 25°C.

Example 3

PREPARATION OF SILANE

A solution of 21 g. of the diene of Example 2, 135 g. of trifluoropropylmethylchlorosilane and 5.9 g. of ditertiary butyl peroxide was heated at reflux at 105 to 115°C. for 20 hours. After removal of the excess chloro silane, the resulting product was distilled to yield

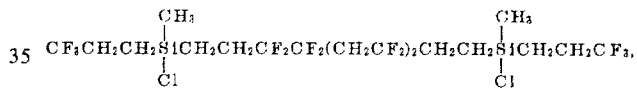

boiling point 138°C. at .4 mm. and having a refractive index of 1.4020 at 25°C.

Example 4

PREPARATION OF SILOXANE AND SILOXANE COPOLYMER 12 g. of the product of Example 3 was hydrolyzed by dissolving in ether and reacting with aqueous sodium bicarbonate. The resulting product was a siloxane having silicon bonded hydroxyl groups on the ends of the molecule and having the unit formula

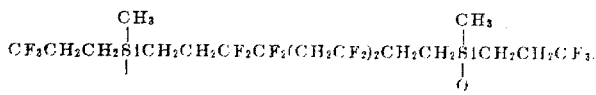

The resulting siloxane was mixed with 130 mg. of trifluoropropyl vinyldichloro silane and the mixture was stirred at 100°C. under a slow stream of dry nitrogen for 15 hours. The resulting mixture was dissolved in ether and the ether solution was washed with saturated sodium bicarbonate solution and then dried. After removal of the ether under vacuum, the copolymer was combined with 5 drops of tetramethylguanidine-trifluoroacetic acid (1:3 mole ratio) solution and heated at 100°C. with stirring under high vacuum to yield a copolymer containing 97 mole percent units of the formula

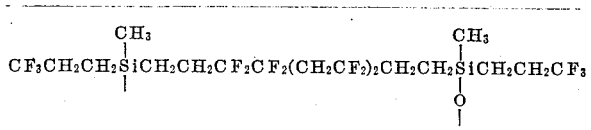

and 3 mole percent trifluoropropyl vinylsiloxane units. The latter serve as crosslinking sites when the polymer is heated with peroxide.

A comparison of the thermal stability and glass transition temperature of this polymer with comparable polymers of U.S. Pat. No. 3,647,740 is shown in the table below. The polymers of the patent were of the formula

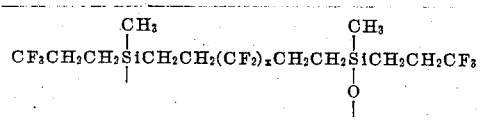

containing about 3 mole percent trifluoropropylvinylsiloxane.

| Polymer Where x = | Glass Transition Temperature °C. | Weight Loss in Air °C. 10% | 50% |
|---|---|---|---|
| 1 | −38 | 343 | 402 |
| 2 | −27 | 407 | 473 |
| 4 | −25 | 402 | 472 |
| 6 | −24 | 400 | 450 |
| Instant Polymer | −34 | 402 | 452 |

Example 5

When dibromides 1, 3 and 4 of Example 1 are reacted with ethylene and then dehydrobrominated in accordance with the procedure of Example 2, and the resulting diene is reacted with CF$_3$CH$_2$CH$_2$(CH$_3$)HSiCl in accordance with the procedure of Example 3, the following silanes are obtained.

| Dibromide | Silane |
|---|---|
| 1 | CF$_3$CH$_2$CH$_2$Si(Cl)(CH$_3$)CH$_2$CH$_2$CF$_2$CF$_2$CH$_2$CF$_2$CH$_2$CH$_2$Si(Cl)(CH$_3$)CH$_2$CH$_2$CF$_3$ |
| 3 | CF$_3$CH$_2$CH$_2$Si(Cl)(CH$_3$)CH$_2$CH$_2$CF$_2$CF$_2$(CH$_2$CF$_2$)$_3$CH$_2$CH$_2$Si(Cl)(CH$_3$)CH$_2$CH$_2$CF$_3$ |
| 4 | CF$_3$CH$_2$CH$_2$Si(Cl)(CH$_3$)CH$_2$CH$_2$CF$_2$CF$_2$(CH$_2$CF$_2$)$_4$CH$_2$CH$_2$Si(Cl)(CH$_3$)CH$_2$CH$_2$CF$_3$ |

Example 6

When the following silanes are added to the diene of Example 2 in accordance with the procedure of that example, the following products are obtained in which Z is the —CH$_2$CH$_2$CF$_2$CF$_2$(CH$_2$CF$_2$)$_2$CH$_2$CH$_2$— radical.

| Silane | Product |
|---|---|
| (CH$_3$)$_2$HSiCl | Cl(CH$_3$)$_2$SiZSi(CH$_3$)$_2$Cl |
| (CH$_3$)C$_6$H$_5$SiHCl | CH$_3$(C$_6$H$_5$)ClSiZSiCl(C$_6$H$_5$)CH$_3$ |
| C$_4$F$_9$CH$_2$CH$_2$(CH$_3$)HSiCl | C$_4$F$_9$CH$_2$CH$_2$(CH$_3$)ClSiZSiCl(CH$_3$)CH$_2$CH$_2$C$_4$F$_9$ |
| (CF$_3$CH$_2$CH$_2$)$_2$HSiCl | (CF$_3$CH$_2$CH$_2$)$_2$ClSiZSiCl(CH$_2$CH$_2$CF$_3$)$_2$ |

Example 7

When each of the silanes of Example 5 is hydrolyzed in an ether solution according to the procedure of Example 4 and the resulting hydrolyzate is stripped of ether and mixed with tetramethyl guanidine trifluoroacetic acid (1:3 mole ratio) and heated at 100°C. with stirring under vacuum, viscous polymers having silicon-bonded hydroxyl groups on the end of the molecules and having the following unit formulae are obtained:

CF$_3$CH$_2$CH$_2$Si(CH$_3$)(O)CH$_2$CH$_2$CF$_2$CF$_2$CH$_2$CF$_2$Si(CH$_3$)CH$_2$CH$_2$CF$_3$

CF$_3$CH$_2$CH$_2$Si(CH$_3$)(O)CH$_2$CH$_2$CF$_2$CF$_2$(CH$_2$CF$_2$)$_3$Si(CH$_3$)CH$_2$CH$_2$CF$_3$

CF$_3$CH$_2$CH$_2$Si(CH$_3$)(O)CH$_2$CH$_2$CF$_2$CF$_2$(CH$_2$CF$_2$)$_4$Si(CH$_3$)CH$_2$CH$_2$CF$_3$

Example 8

When each of the products of Example 6 is hydrolyzed and condensed according to the procedure of Example 7, viscous polymers are obtained having terminal silicon-bonded hydroxyl groups and the unit formulae as follows: Z is the —CH$_2$CH$_2$CF$_2$CF$_2$(CH$_2$CF$_2$)$_2$CH$_2$CH$_2$— radical, (CH$_3$)$_2$SiZSi(CH$_3$)$_2$, CH$_3$(C$_6$H$_5$)SiZSi(C$_6$H$_5$)CH$_3$, C$_4$F$_9$CH$_2$CH$_2$(CH$_3$)SiZSi(CH$_3$)CH$_2$CH$_2$C$_4$F$_9$, and (CF$_3$CH$_2$CH$_2$)$_2$SiZSi(CH$_2$CH$_2$CF$_3$)$_2$.

Example 9

When 1 mole of

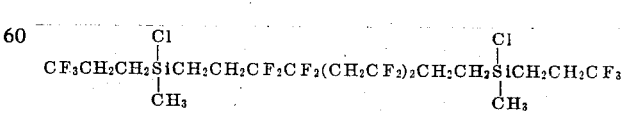

is hydrolyzed in ether solution with aqueous sodium bicarbonate solution and the resulting hydrolyzate is reacted with 2 moles of hexamethyldisilazane under reflux for 20 hours and the volatile by-products, solvent and excess silazane is removed at reduced pressure, a viscous liquid of the formula

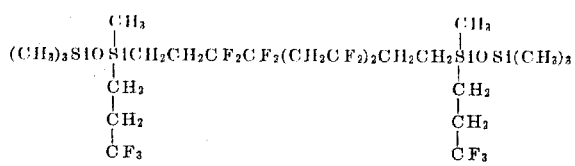

is obtained.

Example 10

When 1 mole of

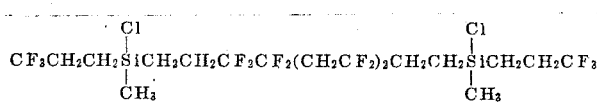

is hydrolyzed in ether solution, as in Example 9, and the hydrolyzate is reacted with five moles of phenyltrichlorosilane in the presence of 2 moles of trimethylamine and the resulting product is dissolved in xylene along with 2 moles of methyltrichlorosilane, 1 mole of dimethyldichlorosilane and 1 mole of phenylmethyldichlorosilane and the mixture hydrolyzed and the water and HCl azeotroped and the solution is then catalyzed with zinc octoate and refluxed to further condense the hydrolyzate, a soluble resin consisting of 10 mole percent

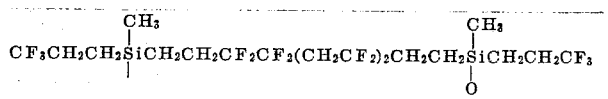

50 mole percent $C_6H_5SiO_{3/2}$, 20 mole percent $CH_3SiO_{3/2}$, 10 mole percent $(CH_3)_2SiO$ and 10 mole percent $C_6H_5(CH_3)SiO$, is obtained.

Example 11

When bis-trifluoropropyl dimethyl chloro disiloxane is substituted for the trifluoropropyl methyl chlorosilane of Example 3, the product

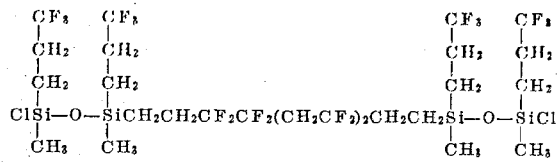

is obtained.

When this product is hydrolyzed according to the procedure of Example 4, a copolymer of 33 mole percent

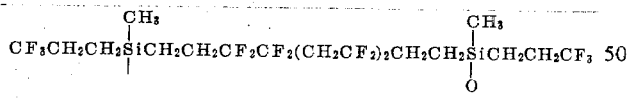

units and 67 mole percent $CF_3CH_2CH_2(CH_3)SiO$ siloxane units is obtained which is endblocked with silicon-bonded OH groups. When this copolymer is mixed with methyl triacetoxy silane and thereafter exposed to moisture the mixture cures to a rubber at room temperature.

Example 12

When tetramethyl chloro disiloxane is employed in the procedure of Example 11, the siloxane

is obtained.

When this silane is cohydrolyzed and cocondensed with methyldichlorosilane and trimethylchlorosilane in the mole ratio of 9:0.5:0.5, a copolymer 30 mole percent

units, 60 mole percent dimethylsiloxane units, five mole percent methyl, hydrogen siloxane units and five mole percent trimethylsiloxane units is obtained. The cocondensation catalyst is trifluoromethane sulfonic acid.

That which is claimed is:

1. A silane of the formula

in which

R is a phenyl, methyl or $R_fCH_2CH_2$- radical in which $R_f$ is a perfluoroalkyl radical of one to four carbon atoms and n is an integer from 1 to 6 inclusive.

2. The compound of claim 1 in which one R on each silicon is $CF_3CH_2CH_2$-, one R on each silicon is methyl, and n is 2.

3. A siloxane having at least one unit of the formula (1)

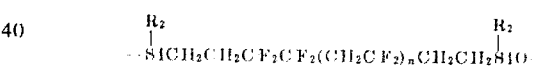

any remaining units being of the formula (2) $R'_mSiO_{4-m/2}$ in which R is a phenyl, methyl or $R_fCH_2CH_2$- radical, R' is H, phenyl, methyl, vinyl, or a $R_fCH_2CH_2$— radical, $R_f$ is a perfluoroalkyl radical of one to four carbon atoms, n is an integer from 1 to 6, and m is an integer from 0 to 3.

4. A composition of claim 3 in which (1) is

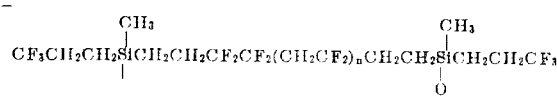

and (2) is trifluoropropylvinylsiloxane.

5. A composition of claim 4 in which n is 2.

* * * * *